United States Patent Office 3,453,257
Patented July 1, 1969

3,453,257
CYCLODEXTRIN WITH CATIONIC PROPERTIES
Stanley M. Parmerter, Wheaton, Earle E. Allen, Jr., Chicago, and Glenn A. Hull, Oak Park, Ill., assignors to Corn Products Company, New York, N.Y., a corporation of Delaware
No Drawing. Filed Feb. 13, 1967, Ser. No. 615,314
Int. Cl. C13l 1/10; C08b 25/02; A24f 47/00
U.S. Cl. 260—209          21 Claims

ABSTRACT OF THE DISCLOSURE

This application covers cyclodextrin products having ether substituents which impart cationic properties to the cyclodextrin. These cyclodextrin products form cationic salts with a variety of anions. The application also covers methods for preparing such cyclodextrin products having substituents which impart cationic properties thereto. The products are useful in sizing paper, as binders, and as flocculants. They are also complexing and clathrating materials.

---

This invention relates to novel, useful derivatives of cyclodextrin, and to methods of producing them.

More particularly, this invention relates to derivatives of cyclodextrin that include ether substituents that impart cationic properties to the cyclodextrin. More precisely, these derivatives include substituents that introduce a positive electrical charge into the molecule.

The cyclodextrins are a group of homologous oligosaccharides that are obtained from starch by the action of enzymes elaborated by *Bacillus macerans*. The cyclodextrins are also known as Schardinger dextrins from an early investigator who studied these materials. They are homologous cyclic molecules containing 6 or more α-D-glucopyranose units linked together at the 1,4 positions as in amylose. The cyclic molecule may also be referred to as a torus. As a consequence of the cyclic arrangement, this trous is characterized by having neither a reducing end group nor a nonreducing end group. The torus molecule is depicted in the following schematic formula, where the hydroxyl groups are shown in the 2, 3, and 6 positions in the illustrated anhydroglucose units. The letter $n$ may be a number from 4 to 6, or higher.

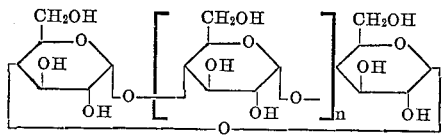

When $n$ is 4, the torus molecule is known as α-cyclodextrin or cyclohexaamylose, because the torus contains six anhydroglucose units; when $n$ is 5, the seven unit member is known as β-cyclodextrin or cycloheptaamylose; and when $n$ is 6, the eight unit member is known as γ-cyclodextrin or cyclooctaamylose. When reference is made herein to "cyclodextrin," it is intended to include the foregoing forms as well as still other tori that have a still larger number of units in the molecule, and, as well, mixtures of these and other homologs.

Cyclodextrin is produced from starch by the action of an enzyme commonly known as cyclodextrin transglycosylase (*B. macerans* amylase). The source of the enzyme is usually a culture of *Bacillus macerans* which is grown under conventional conditions on conventional media containing sources of nitrogen, carbon, growth factors and minerals. The cyclodextrin transglycosylase may be produced by following published teachings such as, for example, those described by D. French in Methods in Enzymology, S.P. Colowick and N.O. Kaplan, editors, Academic Press, New York, N.Y., vol. V, 1962, pp. 148–155.

The cyclodextrin transglycosylase activity in cultures of *Bacillus macerans* may be measured by the Tilden-Hudson procedure as described by these two workers in J. Bacteriol., 43, 527–544, 1942. In general, the cyclodextrin transglycosylase is added to a dilute solution of a gelatinized starch, whereupon a conversion to cyclodextrin occurs by enzymolysis. Procedures for making and isolating the cyclodextrins have been described in the literature, for example, by F. Cramer and D. Steinle, Ann., 595, 81 (1955). If desired, the various homologs such as, for example, the alpha, beta, and gamma, may be fractionated by procedures such as those described by D. French, et al., J. Am. Chem. Soc., 71, 353 (1949).

The various homologous cyclodextrins, having from six to eight units, or higher, and their mixtures, may be used as equivalent materials for the purposes of this invention. In practice, there may be little reason for separating the various fractions, and the cyclodextrin employed may contain a preponderance of β-cyclodextrin, for example. No distinction is intended between the various homologous cyclodextrins or their mixtures unless otherwise indicated, when using the term "cyclodextrin."

Cyclodextrin is known as a clathrating compound, that is, it is adapted to form inclusion compounds. It is known to form a variety of crystalline complexes with many organic substances, particularly with organic liquids of low solubility in water. It is also known to form various complexes with neutral salts, halogens, and bases. In referring to the inclusion and clathrating properties, reference is often made to the torus molecule being a host molecule and the included or complexed molecule being the guest molecule. Cyclodextrin has established utility, and is the subject of study for further applications. It is understandably desirable to provide novel cyclodextrin structures to be used as inclusion compounds, and for other purposes.

It is accordingly one primary object of the invention to provide new cyclodextrin products, namely, cyclodextrin derivatives having ether substituents which impart cationic properties to the cyclodextrin.

It is another object of this invention to provide new cyclodextrin products which have ether substituents imparting cationic properties to the cyclodextrin, with said ether substituents being present in said cyclodextrin in various degrees of substitution.

Another object of this invention is to provide a method for making new cyclodextrin products, in particular, a relatively simple, practical and economical method for making cyclodextrin products having ether moieties which impart desirable cationic properties to the cyclodextrins, such method endowing the new cyclodextrin products with greater attraction for various commercial efforts.

A more general object of the invention is to provide novel cyclodextrin derivatives that are formed from reagents that introduce cationic-type substituents into the molecule, over broad ranges of substitution. A related object of the invention is to provide novel, practical processes for making such derivatives.

Other objects of the invention will be apparent hereinafter from the specification and from the recitals of the appended claims.

In accordance with the invention we have discovered a new class of cyclodextrin derivatives which possess a cationic character. These cyclodextrin derivatives are generally formed by the reaction of cyclodextrin with a reagent that introduces a cationic-type substituent into the molecule. That is, through such reaction the cyclodextrin has introduced into its structure a substituent possessing a positive electrical charge.

Preferred cyclodextrin products of the invention may be represented by the following general formula:

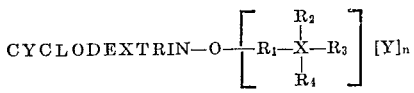

In the foregoing general formula, $R_1$ is the residue of the reactant which reacts with the hydroxyl group of the anhydroglucose unit in the cyclodextrin, and may be an alkylene, a hydroxy alkylene, an otherwise substituted alkylene, an aralkylene, a cycloalkylene, or a phenylene radical. Thus, $R_1$ may be methylene, ethylene, propylene, etc. The foregoing and other alkylene radicals also may have substituted thereon in one or more places a hydroxy, alkyl or aryl radical, cycloalkylene radicals derived from, for example, cyclopropane, cyclobutane and higher homologues. $R_1$ may also represent a phenylene radical and alkyl or halo substituted phenylene radicals. The actual reactive portion, of molecules used to prepare the cyclodextrin derivatives, are in the main a hydroxy vinyl, a halogen, or an epoxy group, as will be described in greater detail later.

X is sulfur, phosphorus or nitrogen. $R_2$ and $R_3$ may be different or the same, and can be alkyl, aryl, aralkyl, cycloalkyl, hydroxyalkyl, halogeno alkyl, cycloheteryl or other substituted alkyls. The radical $R_4$ is sometimes present and sometimes absent. When it is present, it is selected from the same class as $R_2$ and $R_3$ and may be the same as one or both of $R_2$ or $R_3$; or $R_4$ may be different from one or both of $R_2$ and $R_3$.

Thus, $R_2$ and $R_3$ may be methyl, ethyl, n-propyl, t-butyl, heptyl, hexadecyl, and the like alkyl radicals which may also be substituted with hydroxy, halo, alkyl or other substituents. Again, $R_2$ and $R_3$ may be cyclopropyl, cyclopentyl as well as phenyl, alkyl substituted phenyl and other cyclic groups. Further groups that may be represented by $R_2$ and $R_3$ are morpholinyl, pyridyl, pyrrolidyl, furfuryl, imidazolidyl, imidazolyl and the like.

When X is sulfur, the products are sulfonium ether salts. When X is phosphorus, the products are phosphonium ether salts. When X is nitrogen, the products are either quaternary ammonium salts or may be primary, secondary, or tertiary amines or salts of the amines.

When X is nitrogen, therefore, either or both of $R_2$ and $R_3$ may also be hydrogen, as well as one of those radicals mentioned above, and there may not be a substituent $R_4$. When $R_2$ and $R_3$ are hydrogen, $R_4$ is absent, $n$ is one or zero, and Y is an anion such as halide, acetate, formate, nitrate, phosphate, sulfate, and the like, or the residue of any other inorganic or organic acid such as, for example, hydrochloric, hydrobromic, acetic, formic, oleic, stearic, benzoic, butyric, etc. Thus, the cyclodextrin derivatives include primary amines and salts thereof. When $R_4$ is absent and one of $R_2$ or $R_3$ is hydrogen Y may represent an anion or acid as above, and $n$ may be zero or one, whereby secondary amines or salts are represented. When $R_4$ is absent and neither $R_2$ or $R_3$ are hydrogen, $n$ is zero or one, and Y is an anion or acid. In this case tertiary amines or salts are depicted.

When X is sulfur, $R_4$ is absent, $n$ is one, and Y is an anion, so that the general formula above represents sulfonium salts.

When X is phosphorus, then $n$ is one and Y is an anion, so that the general formula represents phosphonium salts.

Thus, the ether products of the invention may be the ammonium quaternary salts, or phosphonium, or sulfonium salts, or they may be the primary, secondary or tertiary amino ethers or salts thereof. Such amino ethers serve usefully as intermediates to prepare the quaternary ammonium salts, as will be described later in more detail.

In preferred cyclodextrin cationic derivatives, $R_2$ and $R_3$ represent hydrogen or alkyl radicals containing up to 18 carbon atoms, and $R_4$, when present, is also an alkyl radical of up to about 18 carbon atoms.

As is known, the anhydroglucose unit may have different degrees of substitution (D.S.), from one to three. In a given quantity of a cyclodextrin derivative, there will generally be some cyclodextrin molecules that are not substituted at all (D.S., 0), together with other molecules that have different degrees of substitution, from 1 to 3. A statistical average is employed to characterize the average D.S. of the entire quantity, although the figure is ordinarily stated as the D.S. rather than as the average D.S.

The present invention embraces derivatives of cyclodextrin (actually, reaction mixtures obtained from the derivatizing of cyclodextrin) whose D.S. is from a small but detectable amount, such as, for example, as little as 0.0001, up to the maximum level of three. This necessarily implies that the cyclodextrin derivatives may be recovered in the form of a mixture with other materials, such as unreacted cyclodextrin, and, as well, in substantially pure form. For example, if there were a single substituent in a single anhydroglucose unit of cyclohexaamylose, the D.S. of the cyclohexaamylose derivative would be 0.167. Since some of the derivatives obtained by the present invention have D.S. values below 0.167, there must be unsubstituted molecules present.

According to present beliefs in the art, the 6 position hydroxyl in any anhydroglucose unit is the most reactive. Further, the hydroxyl at the 2 position is believed to be the next most reactive, and the hydroxyl at the 3 position is believed to bet the least reactive. The present belief of the art further supposes that the 6 position hydroxyl in the anhydroglucose unit will undergo a more extensive substitution or addition than the hydroxyls at the 2 and 3 positions, respectively, but it may be otherwise. Irrespective of the actual sequence or order of reactions or the number of anhydroglucose units involved, the general formula is intended to represent the products of this invention wherein the ether substitution may occur in different degrees of substitution at all or less than all anhydroglucose units in the cyclodextrin.

Ordinarily, the material that is reacted with a "cationic" reagent, in accordance with this invention, will be cyclodextrin either in the form of an homologous mixture of cycloamyloses, or in the form of a substantially pure homolog such as, for example, β-cyclodextrin. However, it is also contemplated that the cyclodextrin may be initially partially derivatized or cross-linked. For example, the cyclodextrin could be phosphorylated so as to be cross-linked and "anionic" in nature.

The terms "cationic" and "anionic" are used here in their prior art sense, to characterize derivatives that migrate, upon electrophoresis, either to the cathode or to the anode respectively. The term "cationic-type" is used to refer to a substituent that would normally result in a cationic cyclodextrin, if the cyclodextrin were not otherwise derivatized or modified. The term "anionic-type" is used in a similar way.

Thus, a cationic-type substituent is one that introduces a positive electrical charge into the molecule, even though the net charge on the molecule is not necessarily positive.

The cyclodextrin derivatives of this invention may, in general, be prepared by reacting cyclodextrin under alkaline conditions with a reactant of the type represented by the formula:

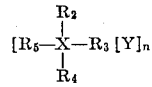

wherein X, $R_2$, $R_3$, $R_4$, and Y represent groups as before stated, $n$ is zero or one, and $R_5$ is a group containing a cyclodextrin reactive site such as halogen, vinyl, or epoxy. Accordingly, $R_5$ may be a halogen substituted alkyl, alkaryl, aryl, cycloaliphatic, or cycloheteryl radical, or a like radical containing an epoxy or vinyl group in place of or in addition to the halide group. It is understood, of course, that the above radicals may contain one or more additional substituents as long as these groups do not interfere with reactivity of the molecule with cyclodextrin.

The tertiary amino ethers may be formed by reacting an etherifying agent with cyclodextrin. Such an agent may be, for example, a dialkyl aminoalkyl halide or a dialkyl aminoalkyl epoxide. A representative dialkyl aminoalkyl halide is 2-chloro-N,N-dimethylethylamine, and a representative dialkyl amino alkyl epoxide is 3-dibutyl amino 1,2 epoxypropane. The resulting tertiary amine derivative may be represented by the formula:

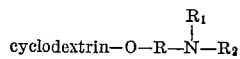

where $R_1$ and $R_2$ are preferably alkyl groups, but also may depict aryl or aralkyl radicals. This tertiary amino ether may then be conventionally quaternized by a reactant such as an alkyl halide, such as, for example, methyl iodide.

Another preferred cyclodextrin product is represented by the following structural formula:

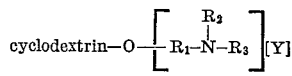

where $R_2$ and $R_3$ are alkyl groups up to about 18 carbon atoms, $R_1$ is a radical as previously defined, and Y is an acid which forms an acid addition salt with the amine portion of the cyclodextrin ether.

One way of preparing the primary amino ethers is to react cyclodextrin with acrylonitrile to obtain the cyanoethylated product, and then reduce this product to obtain the primary amino propyl ether. Such reactions may be represented by the following:

cyclodextrin-CH + CH$_2$=CHCN ⟶ cyclodextrin—O—CH$_2$CH$_2$CN $\xrightarrow{\text{[nascent H]}}$ cyclodextrin—O—CH$_2$CH$_2$CH$_2$NH The foregoing primary amine may be reacted with an alkyl halide to obtain the quaternary ammonium ether derivative.

One preferred way of preparing the cyclodextrin amino ether quaternary products is to react an epoxide form of a quaternary ammonium salt with the cyclodextrin. One way in which this can be done is by treating a chlorohydrin derivative with a strong alkali to convert it to the epoxide form. For example, N-(3-chloro-2-hydroxypropyl) trimethylammonium chloride may be treated with sodium hydroxide to obtain N-(2,3-epoxypropyl) trimethylammonium chloride. This reaction is indicated as follows:

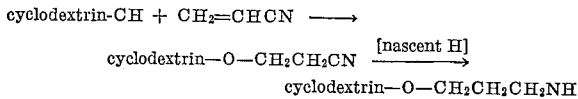

The foregoing form may also be prepared in a different way, by first reacting trimethyl amine and epichlorohydrin. It is preferred to remove any unreacted epihalohydrin from the reaction product to prevent any cross-linking when the reaction product is used. This may be done by using vacuum evaporation or solvent extraction.

The quaternary ammonium etherification agents may have various types of alkyl and aryl substitutions of nitrogen, and when such substitutions are alkyl groups they may contain a number of carbon atoms, say up to about 18.

The products from the foregoing reaction may be isolated by lowering the pH of the reaction mixture towards neutrality and then treating with an alcohol or other solvents to obtain the precipitated product.

The cationic-type substituents of the cyclodextrin products may also be quaternary phosphorus ethers which are prepared, generally, by reacting cyclodextrin under alkali conditions with a quaternary phosphonium represented by the formula:

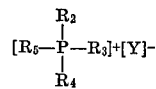

where $R_2$, $R_3$, $R_4$, $R_5$ and Y represent groups as hereinbefore defined. The foregoing are phosphonium etherification reagents and among such reagents may be mentioned 2-chloroethyl tributyl phosphonium chloride, which may be obtained by reacting tributyl phosphine and 2-chloroethanol to obtain 2-hydroxy ethyl tributyl phosphonum chloride. This latter product reacts with thionyl chloride to obtain the phosphonium etherification reagent.

The cationic-type substituents of the cyclodextrin products may also be sulfonium salts which may be obtained by reacting cyclodextrin under alkali conditions with a sulfonium compound represented by the formula:

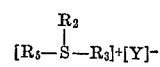

where $R_2$, $R_3$, $R_4$, $R_5$ and Y represent groups as hereinbefore defined. The various sulfonium etherification reagents may include the halogeno alkyl sulfonium salt, the vinyl sulfonium salts, and the epoxy alkyl sulfonium salts. The halogeno alkyl sulfonium salts may be dehydrated to form the vinyl sulfonium salts and the epoxy alkyl sulfonium salts may be obtained by epoxidation of an alkylene sulfonium salt.

Among the sulfonium etherifying reagents which reacts with the cyclodextrins may be mentioned 2-chloroethylmethyl-methylethyl sulfonium iodide, beta-chloroethyl-methyl-[2-(ethylmethyl sulfonium) ethyl] sulfonium diiodide, methyl-cyclohexyl-chloroethyl sulfonium iodide, and the like.

Various other conventional steps may be practiced in the process to facilitate the collection and separation of the foregoing cyclodextrin cationic ethers. This may include neutralizing the basic catalyst and stripping the volatiles under reduced pressure before or after filtration.

The following examples are now presented to teach some embodiments of practicing the invention, but it should be understood that such teachings are only representative and in no sense should they be considered as being exclusive teachings.

Example 1.—Quaternary ammonium ether of β-cyclodextrin

β-cyclodextrin in an amount of 11.3 grams was slurried in 50 ml. of water and to the slurry was added 4.5 ml. of 2 N NaOH to raise the pH to 11.6.

A cationic reagent was previously prepared by cyclizing 9.4 g. N-(3-chloro-2-hydroxypropyl) trimethylammonium chloride to the epoxide form with 24.4 ml. of 2 N NaOH, allowing the mixture to stand for two minutes, and titrating to the neutral end point with a few drops of dilute HCl in the presence of 2 drops of phenolphthalein. The cationic reagent was added to the slurry mixture and allowed to react overnight at 50° C.

Following the reaction period, the pH was reduced to 11.2, and the mixture appeared as a clear homogeneous liquid. The mixture was neutralized to pH 6.5 with 2 N HCl. The mixture was evaporated to dryness. The residue was dissolved in a minimum amount of hot methanol. Chilling gave a precipitate of salt which was discarded. Acetone was then added, whereupon a white, gummy amorphous solid was obtained.

The product was again redissolved in methanol, the solution was poured into acetone in an operating Waring blender, and a finely divided white solid was obtained. The product was dried overnight in a vacuum oven to obtain a yield of 15.41 grams. The percent nitrogen was found to be 2.60%, D.S. 0.41.

Example 2.—Quaternary ammonium ether of β-cyclodextrin

The procedure set out in Example 1 was followed in using 57 grams of β-cyclodextirn and the epoxidized reagent from 395 grams of N-(3-chloro-2-hydroxypropyl) trimethylammonium chloride. The product was precipitated as a gum by the addition of acetone. As much of the gum as possible was then dissolved in 500 ml. of boiling ethanol. Evaporation of the ethanol gave 115 grams of nearly ash-free product. The product melted at 245° C. with decomposition and contained 6.4% nitrogen, which corresponds to a D.S. of 2.4.

Example 3.—Quaternary ammonium ether of β-cyclodextrin

The procedure of Example 2 was followed in using 57 grams of β-cyclodextrin and 132 grams of N-(3-chloro-2-hydroxypropyl)-trimethylammonium chloride. The yield of the product melting at 240° C. with decomposition was 112 grams. Its nitrogen content of 4.8% corresponds to a D.S. of 1.15.

Example 4.—Quaternary ammonium ether of α-cyclodextrin

The procedure of Example 2 was followed in using 20 frams of α-cyclodextrin and 45 grams of N-(3-chloro-2-hydroxypropyl) trimethylammonium chloride. The product crystallized from ethanol as a white solid melting at 255° C. (softening from 240°). Analysis indicated 4.2% nitrogen, corresponding to a D.S. of 0.89.

Example 5.—Tertiary amino ether of β-cyclodextrin

To a mixture of 56 grams of sodium hydroxide in 100 ml. of water was added 113 grams of β-cyclodextrin. A solution of 202 grams of 2-chloro-N,N-dimethylethylamine hydrochloride in 199 ml. of water was then added to the mixture, with cooling. The pH was raised to 11.6 with 2 N sodium hydroxide, then the mixture was heated at 60° C. for sixteen hours.

To the resultant mixture, 2 N hydrochloric acid was added to adjust the pH to 6.2, and then the mixture was poured into a large volume of acetone. The resultant gummy product was dissolved in 1200 ml. of warm water and 300 ml. of toluene was added. The mixture was shaken and left for 24 hours before the crystalline complex was collected.

The yield of the material was 82 grams, and it was characterized by melting at 282° C., with decomposition and browning from 274° C. Analysis indicated 0.98% nitrogen or 0.12 D.S. When a 20 gram sample was boiled with water, 17.7 grams of toluene-free product melting at 291°–292° C. with decomposition was obtained.

Example 6.—Quaternary ammonium ether of cyclodextrin

This example illustrates the preparation of an amino ether of cationic cyclodextrin by process steps similar to Example 1, except that a fatty cationic reagent was prepared by cyclizing N-(3-chloro-2-hydroxypropyl)-N,N-dimethyldodecylammonium chloride to the epoxide form with NaOH. The reaction mixture was prepared by mixing 10 grams of β-cyclodextrin, 20 ml. of 50% NaOH and 14 grams of the fatty cationic reagent in 20 ml. of water.

Example 7.—Solubility determinations

The product obtained according to Example 1 and β-cyclodextrin were compared relative to water solublity. Saturated solutions of each compound were obtained using excess solid in flasks of water, and frequently shaking the flasks over a seven day period. An aliquot was removed from each flask with a pipette which had an attached inlet stopper with glass wool, to prevent entry of any solids. The aliquots were placed in a vacuum oven and held therein at 60° C. for two days. The dried products were weighed until a constant weight was obtained. The solubility results were determined to be as follows:

| Compound: | Solubility, g./100 ml. |
|---|---|
| β-cyclodextrin | 1.48 |
| Quaternary ammonium ether derivative | 76.58 |

The foregoing data shows that the quaternary amino ether derivative has a solubility almost 52 times as great as the β-cyclodextrin.

Example 8.—Tertiary amino ether of β-cyclodextrin

A thick paste was prepared of 113.4 grams (0.1 mole) of β-cyclodextrin and 40 ml. of a 30% aqueous solution of NaOH. The paste was placed in a flask equipped with a mechanical stirrer, and to the flask was then added, portionwise, 51.6 grams of 2-chloro-triethylamine hydrochloride over a one-half hour period. The mixture was then stirred overnight at 50° C.

After 18 hours, the mixture was neutralized to pH 6.5 by the addition of concentrated HCl after adding 100 ml. of water. The mixture was then poured into 3 liters of methanol with stirring. The precipitate was filtered and washed with 1 liter of methanol. The product was then dispersed in acetone in an operating Waring blender, filtered, air dried, and then dried in a vacuum oven at 50° C. for 4 hours.

Example 9.—Quaternization of tertiary amino ether of cyclodextrin

The tertiary amino product of Example 8 was reacted with ethyl chloride in the usual way to obtain the corresponding triethylaminoethyl chloride ether of cyclodextrin.

The cyclodextrin derivatives of the present invention are characterized, in general, by greatly enhanced water solubility. Moreover, many of these derivatives have a positive net molecular electric charge, and all contain substituents that introduce a positive electric charge in the molecule. They are therefore selectively attracted to substances bearing negative molecular charges. These properties make these derivatives particularly desirable for several important commercial and technical applications.

The cyclodextrin derivatives of the present invention are useful, for example, in applications such as the sizing of paper pulp, since such pulp is known to carry a negative charge. They are also useful in other applications, as well, such as, for example, as flocculating agents for anionic colloids, as suspending agents, as emulsifying agents, as textile dye assistants, and the like. One use for the flocculating agents is to facilitate settling of wastes in sewage treatment. Generally, the cyclodextrin derivatives of the present invention may be used in ways similar to the ways in which cationic starches are used. They are also useful in the production of paper, as binders in sizing and coating compositions.

The cationic cyclodextrin derivatives are also useful when incorporated into tobacco or tobacco filters such as cigarette and cigar filters, whether or not these filters are an integral part of the cigarette or cigar itself. In such use the derivatives help to trap tars, undesirable flavors and the like. The derivatives of the present invention are also particularly useful as surfactants. They have particular utility as surface active agents when the molecule contains one or more long chain fatty groups. A preferred surfactant is prepared by alkoxylating the cyclodextrin with 1–50 moles of alkoxylating agent such as ethylene oxide, propylene oxide and the like, followed by introduction of a cationic substituent by reaction of the terminal hydroxide group by one or more of the same reactions as set forth above.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as

We claim:

1. A cyclodextrin ether product represented by the formula:

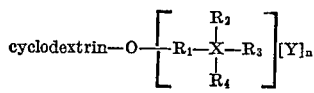

where $R_1$ is of the class consisting of alkylene, hydroxy alkylene, halogeno alkylene, monocyclic aralkylene, cycloalkylene, and phenylene; X is of the class consisting of sulfur, phosphorus and nitrogen; $R_2$ and $R_3$ are of the class consisting of alkyl, monocyclic aryl, monocyclic aralkyl, cycloalkyl, hydroxy alkyl, halogeno alkyl and cyclohetryl; $R_4$ is of the same class as $R_2$ and $R_3$; and Y is an anion and $n$ is one; with the further provision that when X is sulfur, $R_4$ is absent; that when X is nitrogen, $R_2$, $R_3$ may additionally be hydrogen and $R_4$ may additionally be absent, Y may additionally be an acid residue and $n$ is zero or one; providing still further, that when $R_4$ is absent and when neither $R_2$ and $R_3$ are hydrogen, then $n$ is zero or one, and Y is an acid residue when $n$ is one; and when $R_4$ is absent and one of $R_2$ and $R_3$ is hydrogen, then $n$ is zero or one and Y is an acid residue when $n$ is one.

2. A cyclodextrin product as in claim 1 further characterized in that the cyclodextrin product is represented by the following:

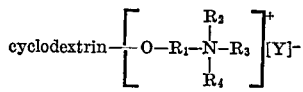

where $R_2$, $R_3$, and $R_4$ are alkyl radicals containing up to about 18 carbon atoms, and Y is an anion.

3. A cyclodextrin product as in claim 1 further characterized in that the cyclodextrin product is represented by the following:

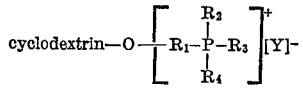

where $R_2$, $R_3$, and $R_4$ are alkyl groups up to about 18 carbon atoms, and Y is an anion.

4. A cyclodextrin product as in claim 1 further characterized in that the cyclodextrin product is represented by the following:

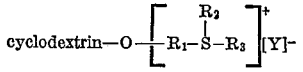

where $R_2$ and $R_3$ are alkyl groups up to about 18 carbon atoms, and Y is an anion.

5. A cyclodextrin product as in claim 1 further characterized in that the cyclodextrin product is represented by the following:

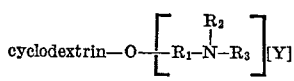

where $R_2$ and $R_3$ are alkyl groups up to about 18 carbon atoms, and Y is an acid which forms an acid addition salt with the amine portion of the cyclodextrin ether.

6. A cyclodextrin product as in claim 1 further characterized in that the cyclodextrin product is represented by the following:

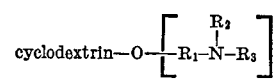

where $R_2$ and $R_3$ are of the class of alkyl groups up to about 18 carbon atoms and hydrogen.

7. A cyclodextrin product as in claim 1 further characterized in that the cyclodextrin product is represented by the following:

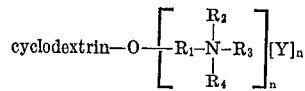

and is characterized by a degree of substitution of from less than 1 up to 3, and the cyclodextrin has from 6 to 8 or more cyclic anhydroglucose units.

8. A cyclodextrin product as in claim 5 further characterized in that the cyclodextrin product is represented by the following:

$$\text{cyclodextrin—O—CH}_2\text{CH}_2\text{N}(\text{C}_2\text{H}_5)_2$$

9. A cyclodextrin ether product in accordance with claim 1 wherein the D.S. is from a small but detectable amount up to 3.

10. A method for preparing cyclodextrin ether products which comprises:

reacting a cyclodextrin with a reactant represented by the following formula:

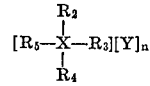

where $R_5$ is of the class consisting of alkyl, alkaryl, monocyclic aryl, cycloaliphatic, and cyclohetryl, further characterized in that each of the foregoing $R_5$ radicals have at least a reactive group of the class consisting of vinyl, epoxy, and halogen; X is of the class consisting of sulfur, phosphorus and nitrogen; $R_2$ and $R_3$ are of the class consisting of alkyl, monocyclic aryl, monocyclic aralkyl, cycloalkyl, hydroxy alkyl, halogeno alkyl and cyclohetryl; $R_4$ is of the same class as $R_2$ and $R_3$; and Y is an anion and $n$ is one; with the further provision that when X is sulfur, $R_4$ is zero; that when X is nitrogen, $R_2$ and $R_3$ may additionally be hydrogen and $R_4$ may additionally be zero, Y may additionally be an acid residue and $n$ is zero or one; providing still further, that when $R_4$ is zero and when neither $R_2$ and $R_3$ are hydrogen, then $n$ is zero or one, and Y is an acid residue when $n$ is one; and when $R_4$ is zero and one or both of $R_2$ and $R_3$ is hydrogen, then $n$ is zero or one and Y is an acid when $n$ is one; and conducting said reaction in the presence of an effective amount of an alkaline catalyst.

11. A method as in claim 10 further characterized in that the reactant is a salt represented by the following formula:

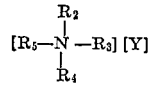

where $R_2$, $R_3$ and $R_4$ are alkyl groups up to about 18 carbon atoms and Y is an anion, further characterized in that the reaction is conducted at elevated temperatures to accelerate the reaction; and a sufficient amount of said salt reactant is reacted with said cyclodextrin to attain a desired degree of substitution at the anhydroglucose units in said cyclodextrin.

12. A method as in claim 10 further characterized in that the salt reactant represented by the following formula:

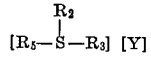

where $R_2$ and $R_3$ are alkyl groups up to about 18 carbon atoms and Y is an anion, further characterized in that the reaction is conducted at elevated temperatures to accelerate the reaction, and wherein the foregoing salt reactant is added in an amount sufficient to obtain a desired degree of substitution of said salt reactant at the anhydroglucose units in said cyclodextrin.

13. A method as in claim 10 further characterized in that the salt reactant is represented by the following formula:

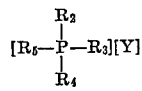

where $R_2$, $R_3$ and $R_4$ are alkyl groups up to about 18 carbon atoms and Y is an anion, further characterized in that said reaction is conducted at elevated temperatures to accelerate the reaction, and said salt reactant is added in an amount sufficient to obtain a desired degree of substitution of said salt reactant at the anhydroglucose units in said cyclodextrin.

14. A method for preparing amino and ammonium ether derivatives of cyclodextrin which includes reacting a cyclodextrin with acrylonitrile, reducing the cyanoethylated product to obtain a primary aminopropyl ether derivative, and reacting said primary amino ether product with an alkyl halide in amounts sufficient to obtain secondary and tertiary amino ethers and quaternary ammonium ethers of cyclodextrin.

15. The quaternary ammonium ethers of cyclodextrin.

16. The quaternary phosphorus ethers of cyclodextrin.

17. The sulfonium ethers of cyclodextrin.

18. N,N-dimethyl, N-(2-cyclodextrin oxyethyl)amine hydrochloride.

19. N,N-diethyl, N-(2-cyclodextrin oxyethyl)amine hydrochloride.

20. The tertiary amine ethers of cyclodextrin.

21. The amine ethers of cyclodextrin.

References Cited

UNITED STATES PATENTS

| | | | |
|---|---|---|---|
| 2,539,704 | 1/1951 | Schoene et al. | 260—209 |
| 3,140,184 | 7/1964 | Robbins. | |
| 3,222,358 | 12/1965 | Touey et al. | 260—209 |
| 3,346,555 | 10/1967 | Nordgren | 260—209 |

LEWIS GOTTS, *Primary Examiner.*

JOHNNIE R. BROWN, *Asssistant Examiner.*

U.S. Cl. X.R.

62—175; 117—156; 131—17, 264; 210—54, 502; 252—351

UNITED STATES PATENT OFFICE
CERTIFICATE OF CORRECTION

Patent No. 3,453,257                              July 1, 1969

Stanley M. Parmerter et al.

It is certified that error appears in the above identified patent and that said Letters Patent are hereby corrected as shown below:

Column 1, line 41, "trous" should read -- torus --. Column 4, line 30, "bet" should read -- be --. Column 5, lines 35 to 38, the formula should appear as shown below:

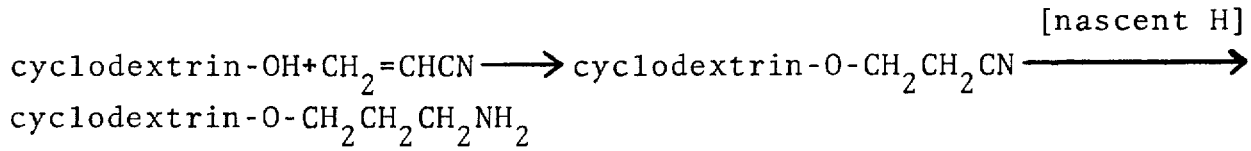

Column 6, line 13, "phosphonum" should read -- phosphonium --; line 55, "9.4 g." should read -- 9.4 g --. Column 7, line 26, "frams" should read -- grams --.

Signed and sealed this 31st day of March 1970.

(SEAL)
Attest:

EDWARD M. FLETCHER, JR.                    WILLIAM E. SCHUYLER, JR.
Attesting Officer                             Commissioner of Patents